(12) United States Patent
Ninomiya et al.

(10) Patent No.: US 12,282,614 B2
(45) Date of Patent: Apr. 22, 2025

(54) ELECTRONIC PEN

(71) Applicant: Wacom Co., Ltd., Saitama (JP)

(72) Inventors: Kenichi Ninomiya, Saitama (JP); Mamoru Ogata, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/488,458

(22) Filed: Oct. 17, 2023

(65) Prior Publication Data

US 2024/0160302 A1 May 16, 2024

(30) Foreign Application Priority Data

Nov. 10, 2022 (JP) ................... 2022-180369

(51) Int. Cl.
*G09G 5/00* (2006.01)
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC .. G06F 3/0414; G06F 3/04162; G06F 3/0383; G06F 3/03545; G06F 3/0416; G06F 2203/04105; G06F 2203/04107
USPC ....................................................... 345/179
See application file for complete search history.

(56) References Cited

U.S. PATENT DOCUMENTS

| | | | |
|---|---|---|---|
| 2017/0068342 A1* | 3/2017 | Zimmerman | G06F 3/0414 |
| 2017/0371434 A1 | 12/2017 | Kobori | |
| 2018/0024657 A1* | 1/2018 | Ninomiya | G06F 3/033 |
| | | | 345/179 |
| 2020/0371609 A1* | 11/2020 | Yamada | G06F 3/044 |

FOREIGN PATENT DOCUMENTS

JP   2017228185 A   12/2017

* cited by examiner

*Primary Examiner* — Jennifer T Nguyen
(74) *Attorney, Agent, or Firm* — Seed IP Law Group LLP (57) ABSTRACT

Provided is an electronic pen including a tubular housing having an opening at one end, a core body portion including a rod-shaped core body and a pressure member that holds a rear end of the core body and transmits a force applied to the core body, a writing pressure detector that detects a writing pressure applied to the core body, and a tubular holding member that accommodates and holds the core body portion. At least part of a side surface of the core body portion includes a flat surface portion parallel to an axial direction of the pen. An inner edge of the holding member has a cylindrical shape and at least part of the inner edge includes a protruding portion. With the core body portion mounted in the housing, the flat surface portion of the core body portion and the protruding portion of the holding member face each other.

16 Claims, 6 Drawing Sheets

ELECTRONIC PEN

BACKGROUND

Technical Field

The present disclosure relates to an electronic pen used as a position indicator for a position detection device mounted in an information processing device such as, for example, a tablet personal computer (PC).

Description of the Related Art

Figure 9A:
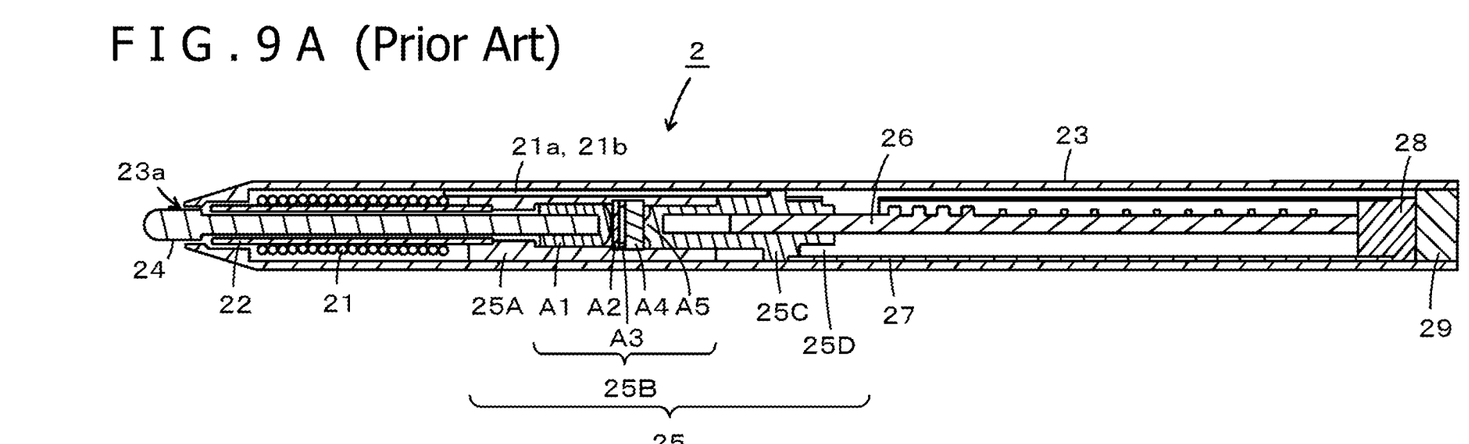
FIGS. 9A and 9B are views for describing an example of a configuration of an electronic pen in the related art.

Japanese Patent Laid-Open No. 2017-228185 discloses an example of a configuration of an electromagnetic induction electronic pen 2. Specifically, as illustrated in FIG. 9A, the electronic pen 2 includes various members for realizing electronic pen functions mounted in a housing 23. A core body 24 is inserted into a through-hole of a ferrite core 22 to penetrate the ferrite core 22 in an axial direction. The core body 24 inserted into the through-hole of the ferrite core 22 has a diameter slightly smaller than the diameter of the through-hole such that the core body 24 can slidably move in the axial direction in the through-hole.

As illustrated in FIG. 9A, a portion of a predetermined length of the ferrite core 22 including the center in the axial direction is used as a coil wound portion around which a coil 21 is wound along the axial direction, and the portions of the ferrite core 22 on the opposite sides of the predetermined length portion are used as coil non-wound portions around which no coil is wound. Conductor lines 21a and 21b, which are extension wires from the opposite ends of the coil 21 wound around the ferrite core 22, are extended to a printed board 26 on the inner side of the housing 23 and connected to a capacitor Cf provided on the printed board 26. Consequently, a resonance circuit is configured from the coil 21 and the capacitor Cf on the printed board 26 such that a signal can be transferred through electromagnetic induction between the resonance circuit and an electromagnetic induction position detection device.

A connection portion 25 is provided on the opposite side to a pen tip of the core body 24 and includes a molded portion 25A, a writing pressure detection portion 25B, a fitting portion 25C, and a connection terminal portion 25D. The connection portion 25 is a portion which integrally connects a pen tip side portion, which is configured from the coil 21, the ferrite core 22, and the core body 24, and the printed board 26 and a board protection pipe 27 to each other. Further, a core body holding portion A1, a conductive rubber A2, a ring spacer A3, a dielectric A4, and a terminal member A5 are provided inside the molded portion 25A as illustrated in FIG. 9A. The members described above are sandwiched by the molded portion 25A and the fitting portion 25C and configure the writing pressure detector 25B that has a configuration of a variable capacitor and that detects a writing pressure.

The conductor line connected to the conductive rubber A2 and the conductor line connected to the terminal member A5 pass, for example, along the outer side of the molded portion 25A and the fitting portion 25C, are connected to terminals of the connection terminal portion 25D, and further connected to an electronic circuit of the printed board 26 through the terminals of the connection terminal portion 25D. Consequently, the electronic circuit of the printed board 26 can detect the writing pressure applied to the core body 24, as a change in the capacitance in the writing pressure detection portion 25B configured as the variable capacitor as described above.

The fitting portion 25C is a portion to fit with the board protection pipe 27. The fitting portion 25C is formed, for example, in a substantially cylindrical shape from resin or hard rubber and is fitted firmly and integrally with the molded portion 25A. A recessed portion is provided on the inner side of the fitting portion 25C such that a front-end portion of the printed board 26 is fitted into the recessed portion. Thus, where the board protection pipe 27 is fitted with the fitting portion 25C, the outer circumference of the board protection pipe 27 coincides with the outer circumference of the fitting portion 25C or the molded portion 25A.

The connection terminal portion 25D is a portion formed from two upper and lower plate portions connecting to the fitting portion 25C as illustrated in FIG. 9A. The plate portions sandwich therebetween the printed board 26 described later. One of the two plate portions, for example, the upper side plate portion in FIG. 9A, is provided such that the terminal to which the conductor lines from the conductive rubber A2 and the terminal member A5 are connected extends from the upper side face to the lower side face of the upper side plate portion surrounding an end face of the upper side plate portion on the circuit board side. Consequently, when the printed board 26 is inserted into the connection terminal portion 25D, the terminal of the upper side plate portion is automatically connected to a terminal portion of the electronic circuit provided on the printed board 26.

The printed board 26 is formed such that terminals to the electronic circuit described above and various circuit parts configuring the electronic circuit are mounted on an insulating board of a rectangular shape and wiring lines connecting the terminals and the circuit parts to each other are provided. The various circuit parts include an integrated circuit (IC) which functions as a control circuit and a plurality of capacitors such as the capacitor Cf and so forth. The printed board 26 is accommodated inside and protected by the board protection pipe 27 as illustrated in FIG. 9A.

The board protection pipe 27 is a hard pipe member which is less likely to bend or curve. The board protection pipe 27 has a core body side opening and a rear end side opening at the opposite ends thereof. The fitting portion 25C of the connection portion 25 is inserted into and fitted with a portion of the board protection pipe 27 within a predetermined range from the core body side opening. Similarly, a pipe lid 28 is inserted into and fitted with a portion of the board protection pipe 27 within a predetermined range from the rear end side opening. The pipe lid 28 has a recessed portion provided thereon in which an end portion of the printed board 26 is to be inserted.

Consequently, the core body 24 is inserted from the rear-end portion of the core body 24 into the core body holding portion A1 through an opening 23a of the housing 23, and is mounted in the housing 23 with a front-end portion of the core body 24 protruding from the housing 23. In other words, the core body holding portion A1 constitutes a mounting portion of the core body 24. In this case, the pen tip side portion in which the core body 24 is inserted into the ferrite core 22 having the coil 21 wound thereon, the connection portion 25, the board protection pipe 27 in which the printed board 26 is accommodated, and the pipe lid 28 are connected integrally with each other. They are accommodated in the housing 23 and closed by a rear end lid 29, so that they are held in the housing 23, configuring the electronic pen 2.

Figure 9B:
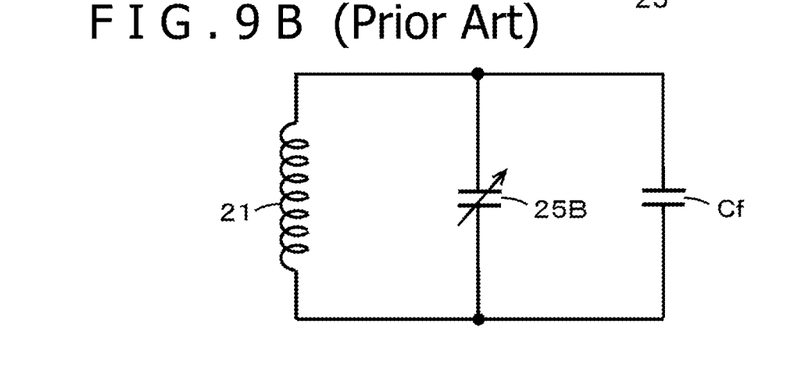

The electronic pen 2 illustrated in FIG. 9A is represented by an equivalent circuit illustrated in FIG. 9B. In particular, the coil 21, the writing pressure detection portion 25B having a configuration of the variable capacitor, and the capacitor Cf on the printed board 26 are connected in parallel to each other to configure the resonance circuit. Consequently, the electronic pen 2 can transmit and receive a signal to and from a position detection device which includes an electromagnetic induction position detector sensor described later.

In the case of the electromagnetic induction electronic pen 2 illustrated in FIGS. 9A and 9B, the core body 24 can slidably move in the axial direction according to the applied writing pressure. Consequently, the writing pressure applied to the core body 24 can be detected by the writing pressure detection portion 25B. As can be seen from FIG. 9A, side surfaces of the core body 24 and the core body holding portion A1 are basically not engaged with surrounding inner wall surface of the ferrite core 22 or the molded portion 25A in order not to interfere with the transmission of the writing pressure. With this structure, when the pen tip of the core body 24 of the electronic pen 2 is brought into contact with an operation surface for a writing input, the core body 24 and the core body holding portion A1 may rotate about the axis.

Existing writing instruments such as pencils, mechanical pencils, ballpoint pens, and fountain pens all do not cause their pen tips to rotate about their axes when the pen tips are brought into contact with a paper surface for a writing input. Therefore, if the core body 24 and the core body holding portion A1 rotate about the axis during use of the electronic pen 2, the users may find a writing feel of the electronic pen 2 as different from that of the existing writing instruments, and some of them may find it difficult to write with the electronic pen 2. This is not only true for the electromagnetic induction electronic pens, but also true for electronic pens of various other systems having a configuration in which the core body rotates about the axis.

BRIEF SUMMARY

It is desirable to provide an electronic pen that prevents a core body from rotating about the axis and allows the user to use the electronic pen without a feeling of strangeness during a writing input.

There is provided an electronic pen including a tubular housing having an opening at one end, a core body portion including a rod-shaped core body protruding from the opening of the housing with one end serving as a pen tip and a pressure member that holds a rear end of the core body and transmits a force applied to the core body, a writing pressure detector that is fixed inside the housing, wherein the writing pressure detector, in operation detects a writing pressure applied to the core body, and a tubular holding member that is fixed inside the housing and accommodates and holds the core body portion, in which at least part of a side surface of the core body portion includes a flat surface portion parallel to an axial direction of the electronic pen, an inner edge of the holding member has a cylindrical shape and at least part of the inner edge includes a protruding portion, and, with the core body portion mounted in the housing, the flat surface portion of the core body portion and the protruding portion of the holding member face each other.

The electronic pen includes the housing, the core body portion including the core body and the pressure member, the writing pressure detector, and the holding member. The pressure member holds the rear end of the core body and presses the writing pressure detector according to the writing pressure applied to the core body. The holding member has a tubular shape, is fixed inside the housing, and accommodates and holds a rear end side of the core body portion. At least part of the side surface of the core body portion includes the flat surface portion parallel to the axial direction. Further, at least part of an inner wall surface of the holding member includes the protruding portion. With the core body portion mounted in the housing, the flat surface portion of the core body portion and the protruding portion of the holding member face each other.

This structure inhibits the core body portion held by the holding member from rotating about the axis. Further, even if the core body portion held by the holding member slightly rotates about the axis, the inner wall surface of the holding member and the side surface of the core body portion are in partial surface-to-surface contact and do not strongly engage with each other, being free from what is generally called a "catching" state. This means that the sliding movement of the core body portion in the axial direction is not inhibited, and thus a writing pressure can be detected properly.

DETAILED DESCRIPTION

An electronic pen according to an embodiment of the present disclosure is described below with reference to the drawings. There are various indicated position detection systems that can be used between an electronic pen and a position detection device. The present disclosure is applicable to electronic pens of various systems such as electromagnetic induction electronic pens and capacitive electronic pens.

In an electromagnetic induction system, a position detection device includes a sensor in which a plurality of loop coils are arranged in each of an X-axial direction and a Y-axial direction. The position detection device alternates between a transmission period and a reception period. In the transmission period, power is sequentially supplied to the plurality of loop coils of the sensor to generate a magnetic field. In the reception period, the power supply stops, and a magnetic field is received from outside. A corresponding electronic pen includes a resonance circuit including a coil and a capacitor. A current flowing through the coil in response to the magnetic field from the sensor generates a signal. The electronic pen then transmits the signal including writing pressure information to the position detection device. The position detection device receives this signal during the reception period and detects the position indicated by the electronic pen and the writing pressure of the electronic pen.

In a capacitive system, a position detection device includes a sensor in which a plurality of linear conductors (line electrodes) are arranged in each of an X-axial direction and a Y-axial direction. The sensor detects the indicated position according to a change in capacitance (electric charge) generated in the linear conductors when a finger or a capacitive pen is brought close to the sensor. The capacitive pen may be a pen-type position indicator that is electrically conductive or an electronic pen of an active capacitive coupling (AES) system that is driven by a battery and transmits a signal. The electronic pen of the active capacitive coupling system may be referred to as an "active capacitive pen" or an "AES pen." In the case of the active capacitive coupling system using the active capacitive pen, the electronic pen transmits a signal from an oscillation circuit mounted in the electronic pen together with writing pressure information, and the position detection device receives the signal including the writing pressure information, thereby detecting the indicated position and the writing pressure. For ease of description, the following description assumes the case where the present disclosure is applied to an electronic pen of the electromagnetic induction (electro magnetic resonance (EMR)) system as an example.

Example of Configuration of Main Components of Electronic Pen 1

Figure 1:
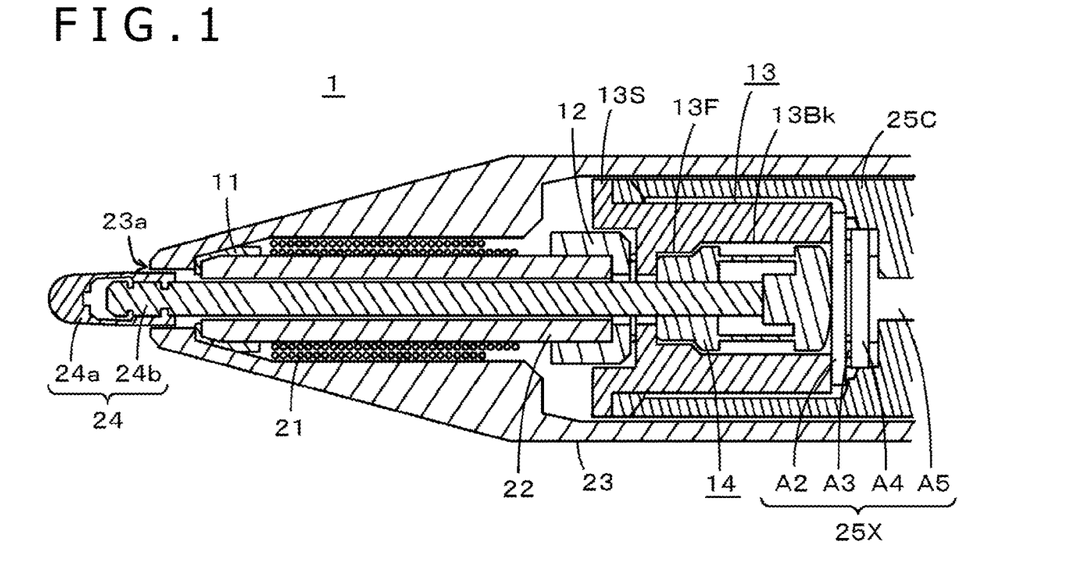
FIG. 1 is a view for describing a configuration of a pen tip side portion of an electronic pen according to an embodiment.

FIG. 1 is a view for describing an example of a configuration of a pen tip side portion of an electronic pen 1 according to an embodiment of the present disclosure. As described above, the electronic pen 1 according to the present embodiment is of the electromagnetic induction system and has a basic configuration similar to that of the related-art electronic pen 2 of the electromagnetic induction system illustrated in FIG. 9A. Therefore, the components having configurations similar to those of the related-art electronic pen 2 of the electromagnetic induction system illustrated in FIG. 9A are given the same reference signs in FIG. 1, and the detailed description thereof is omitted to avoid redundant description. However, a configuration of the pen tip side portion of the electronic pen 1 according to the present embodiment is partially different from that of the electronic pen 2 in the related art. The following description focuses on the configuration of the electronic pen 1 according to the present embodiment different from that of the related-art electronic pen 2 illustrated in FIG. 9A.

In the electronic pen 1 according to the present embodiment, the ferrite core 22 having the coil 21 wound around a side surface of the ferrite core 22 is held by a front-end holding portion 11 and a rear-end holding portion 12. The front-end holding portion 11 is provided in contact with an inner wall surface of the housing 23 on the pen tip side and holds a front-end portion of the ferrite core 22 on the pen tip side. The rear-end holding portion 12 is provided such that part of the rear-end holding portion 12 on the rear end side is fitted into a fitting hole formed on the pen tip side of a holding member 13 described later, and holds the rear end of the ferrite core 22. This structure always restricts the position of the ferrite core 22 in the housing 23 and stably holds the ferrite core 22, preventing the ferrite core 22 from rattling.

In the electronic pen 1 according to the present embodiment, the core body 24 includes a pen tip 24a and a shaft 24b. The pen tip 24a is formed in a dome shape from a resin material such as, for example, polyacetal. The shaft 24b is formed in a rod shape from, for example, a carbon material. In the pen tip portion, the space between the pen tip 24a and the shaft 24b is made of resin different from the pen tip 24a, for example, resin harder than the pen tip 24a. With this structure, the core body 24 is a thin core body that provides a good writing feel without damaging an operation surface of an electronic device and includes the pen tip, which is less likely to be worn, and the shaft 24b, which is less likely to be broken.

In the electronic pen 1 according to the present embodiment, moreover, a pressure member 14, which holds the rear end of the core body 24 and presses a writing pressure detector 25X according to a writing pressure applied to the core body 24, is accommodated and held in the holding member 13. In the present embodiment, the pressure member 14 does not rotate about the axis in the holding member 13, as described in detail later. This structure prevents the core body 24 with the rear end held by the pressure member 14 from rotating about the axis.

In the related-art electronic pen 2 illustrated in FIG. 9A, as described above, the writing pressure detector 25B includes the core body holding portion A1, the conductive rubber A2, the ring spacer A3, the dielectric A4, and the terminal member A5. By contrast, the electronic pen 1 according to the present embodiment is characterized by the pressure member 14, which corresponds to the core body holding portion A1, and the holding member 13, which is not provided in the electronic pen 2 in the related art. The portion including the conductive rubber A2, the ring spacer A3, the dielectric A4, and the terminal member A5 is configured similarly to that of the electronic pen 2 in the related art. Therefore, in the electronic pen 1 according to the present embodiment, the portion including the conductive rubber A2, the ring spacer A3, the dielectric A4, and the terminal member A5 and excluding the pressure member 14, which corresponds to the core body holding portion A1, is referred to as the writing pressure detector 25X.

As illustrated in FIG. 1, the holding member 13 has a tubular shape and is fixed by the fitting portion 25C in the housing 23 so as not to move in the axial direction or rotate about the axis. The holding member 13 accommodates and holds the pressure member 14, which has a substantially cylindrical shape. As illustrated in FIG. 1, the holding member 13 includes a front-side fitting portion 13F into which a front-side portion of the pressure member 14 fits and a rear-side fitting portion 13Bk into which a rear-side portion of the pressure member 14 fits, as described in detail later. In this case, the diameter of the rear-side fitting portion 13Bk is larger than the diameter of the front-side fitting portion 13F. Further, a core body insertion hole through which the core body 24 is inserted is formed at an end of the front-side fitting portion 13F on the pen tip side, while a rear-end opening through which the pressure member 14 is attached is formed at an end of the rear-side fitting portion 13Bk on the rear end side.

The pressure member 14 is accommodated and held in the holding member 13, as illustrated in FIG. 1. The pressure member 14 holds the rear end of the core body 24 inserted from the opening 23a on the pen tip side of the housing 23 and realizes a function of pressing the writing pressure detector 25X according to the writing pressure applied to the pen tip of the core body 24. The pressure member 14 has a substantially cylindrical shape and includes the front-side portion that fits into the front-side fitting portion 13F of the holding member 13 and the rear-side portion that fits into the rear-side fitting portion 13Bk of the holding member 13, as described in detail later. As illustrated in FIG. 1, the pressure member 14 includes a core-body holding hole through which the rear end of the core body 24 is inserted from a front-end surface of the front-side portion, and holds the rear end of the core body 24 inserted from the core-body holding hole. As illustrated in FIG. 1, a rear-end surface of the rear-side portion of the pressure member 14 has a spherical surface to press the conductive rubber A2 of the writing pressure detector 25X.

Examples of Configurations of Holding Member 13 and Pressure Member 14

Figure 2A:
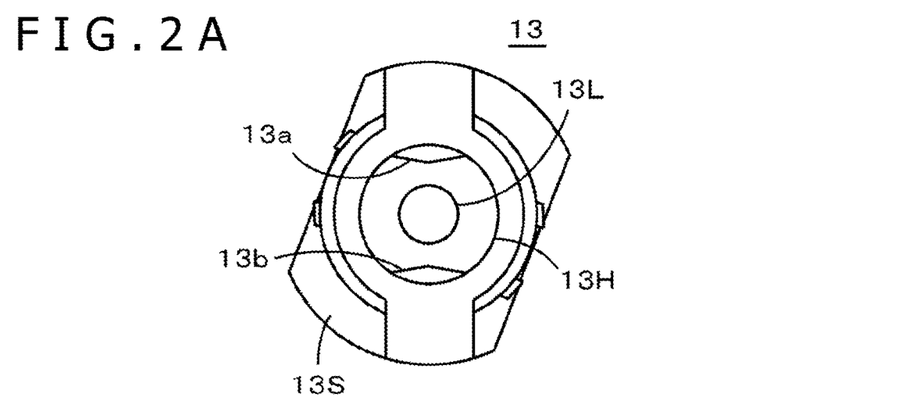
FIGS. 2A and 2B are views for describing a holding member and a pressure member of the electronic pen according to the embodiment.
Figure 2B:
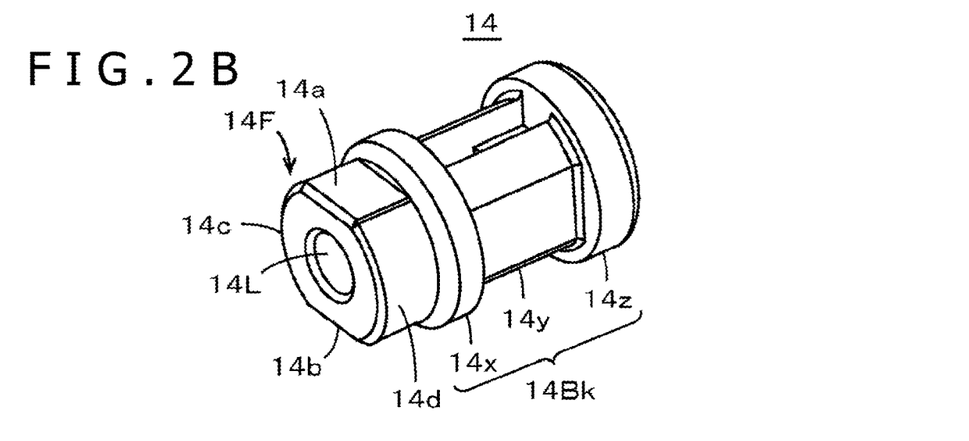

The configurations of the holding member 13 and the pressure member 14 are specifically described below. FIGS. 2A and 2B are views for describing the holding member 13 and pressure member 14 of the electronic pen 1 according to the embodiment. Specifically, FIG. 2A is a view of the holding member 13 seen from the rear end side. FIG. 2B is a perspective view of the pressure member 14.

As illustrated in FIG. 1, while the holding member 13 has a tubular shape, an end portion of the holding member 13 on the pen tip side is a wide portion 13S, which extends outward from the tubular-shaped portion of the holding member 13. As illustrated in FIG. 2A, the wide portion 13S includes a portion in which arc-shaped side surfaces face each other and a portion in which straight side surfaces face each other. In this case, the straight side surfaces are joined to straight inner wall surfaces of the fitting portion 25C, so that the holding member 13 itself does not rotate about the axis in the housing 23. Further, the wide portion 13S is pushed in toward the pen tip side from the rear end side by an end surface of a side wall of the fitting portion 25C on the pen tip side. This prevents the holding member 13 from moving in the axial direction in the housing 23. The wide portion 13S of the holding member 13 on the pen tip side is engaged with a protrusion (not illustrated) formed on the inner wall surface of the housing 23 on the pen tip side, preventing the movement toward the pen tip side.

As illustrated in FIG. 2A, as seen from the rear end side, the holding member 13 includes a rear-end opening 13H at an end on the rear end side and a core-body insertion hole 13L at an end on the pen tip side. Inside the holding member 13, as illustrated in FIG. 1, the front-side fitting portion 13F is provided on the pen tip side, and the rear-side fitting portion 13Bk whose diameter is larger than that of the front-side fitting portion 13F is provided at the rear end of the front-side fitting portion 13F. The rear-side fitting portion 13Bk has a space having a cylindrical shape.

The front-side fitting portion 13F includes mountain-shaped surface portions 13a and 13b at opposing positions across the core-body insertion hole 13L, not in the space having a cylindrical shape but on inner wall surfaces of the front-side fitting portion 13F. Each of the mountain-shaped surface portions 13a and 13b of the front-side fitting portion 13F is a mountain-shaped (V-shaped) surface portion. Specifically, a linear portion extending in the direction along the axial direction protrudes inward, thereby forming the mountain-shaped (V-shaped) surface portion with the linear portion serving as the vertex and having surfaces inclined to the left and right, as illustrated in FIG. 2A. The portions other than the mountain-shaped surface portions 13a and 13b of the front-side fitting portion 13F are inner wall surfaces having an arc shape.

The pressure member 14 is inserted into the holding member 13 from the rear-end opening 13H of the holding member 13 and is held in the holding member 13, as described above. As illustrated in FIG. 2B, the pressure member 14 has a substantially cylindrical shape and includes a front-side portion 14F and a rear-side portion 14Bk. As illustrated in FIG. 2B, a core-body holding hole 14L is formed on the front-end surface of the front-side portion 14F. The rear end of the core body 24 is inserted into the pressure member 14 through the core-body holding hole 14L and held to contact a portion protruding from an inner bottom surface toward the pen tip side as illustrated in FIG. 1. When a writing pressure is applied to the core body 24, the conductive rubber A2 of the writing pressure detector 25X can be pressed by the rear-end surface of the pressure member 14 in which the core body 24 is held and which has a wider region than a rear-end surface of the core body 24 itself.

The front-side portion 14F of the pressure member 14 fits into the front-side fitting portion 13F of the holding member 13. As illustrated in FIG. 2B, the front-side portion 14F includes a pair of side surfaces facing each other across the core-body holding hole 14L. Specifically, the side surfaces facing each other are flat surface portions (pressure-member flat surface portions) 14a and 14b that have smooth surfaces. Further, the front-side portion 14F includes a pair of side surfaces facing each other that are not the flat surface portions 14a and 14b. These side surfaces that are not the flat surface portions 14a and 14b have an arc shape. As described in detail later, the flat surface portions 14a and 14b are the portions facing the mountain-shaped surface portions 13a and 13b of the front-side fitting portion 13F of the holding member 13, and the arc-shaped side surface portions are the portions facing arc-shaped inner wall surfaces of the holding member 13.

In the front-side portion 14F, the distance (length) between the flat surface portions 14a and 14b is slightly smaller than the linear distance (length) connecting the vertex of the mountain-shaped surface portion 13a and the vertex of the mountain-shaped surface portion 13b of the front-side fitting portion 13F of the holding member 13. The linear distance (the inner diameter of the front-side portion 14F) passing through the center of the front-side portion 14F and connecting the arc-shaped side surfaces is slightly smaller than the linear distance (the inner diameter of the front-side fitting portion 13F) passing through the center of the front-side fitting portion 13F of the holding member 13 and connecting the arc-shaped inner wall surfaces. With this structure, the front-side portion 14F of the pressure member 14 can fit into the front-side fitting portion 13F of the holding member 13.

The rear-side portion 14Bk of the pressure member 14 includes three portions: a front-side protruding portion 14x, a middle portion 14y, and a rear-side protruding portion 14z, as illustrated in FIG. 2B. As illustrated in FIG. 2B, the front-side protruding portion 14x and the rear-side protruding portion 14z are disk-shaped portions having a small thickness in the axial direction, and the diameters (outer diameters) of these portions are slightly smaller than the inner diameter of the rear-side fitting portion 13Bk of the holding member 13.

The middle portion 14y is a portion connecting the front-side protruding portion 14x and the rear-side protruding portion 14z and has a side surface having a flat portion and a portion hollowed out in the direction intersecting the axis, such that a through-hole is formed in the direction intersecting the axis. With this structure, the rear-side portion 14Bk of the pressure member 14 can fit into the rear-side fitting portion 13Bk of the holding member 13. In this case, side surfaces of the front-side protruding portion 14x and the rear-side protruding portion 14z may contact inner wall surfaces of the rear-side fitting portion 13Bk of the holding member 13.

In this way, in the electronic pen 1 according to the present embodiment, the pressure member 14 is inserted into and attached to the holding member 13 from the front-side portion 14F through the rear-end opening of the holding member 13. In this case, as illustrated in FIG. 1, the front-side portion 14F of the pressure member 14 fits into the front-side fitting portion 13F of the holding member 13, and the rear-side portion 14Bk of the pressure member 14 fits into the rear-side fitting portion 13Bk of the holding member 13, so that the pressure member 14 is held in the holding member 13.

Figure 3A:
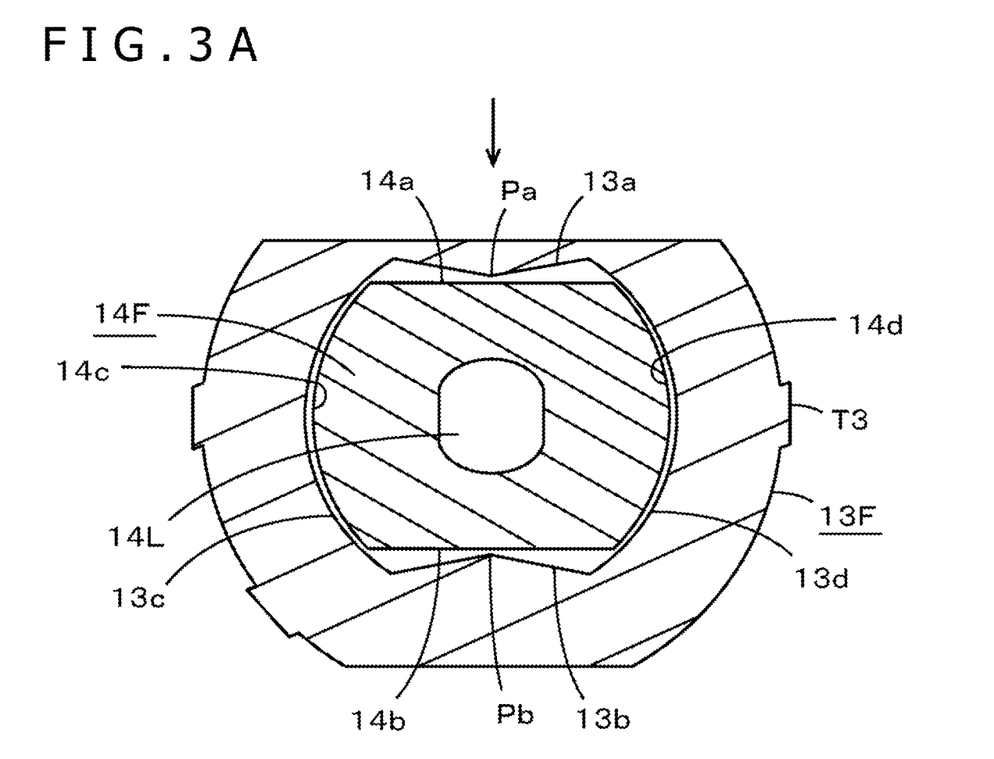
FIGS. 3A and 3B are views for describing the state in which a front-side portion of the pressure member fits into a front-side fitting portion of the holding member of the electronic pen according to the embodiment.
Figure 3B:
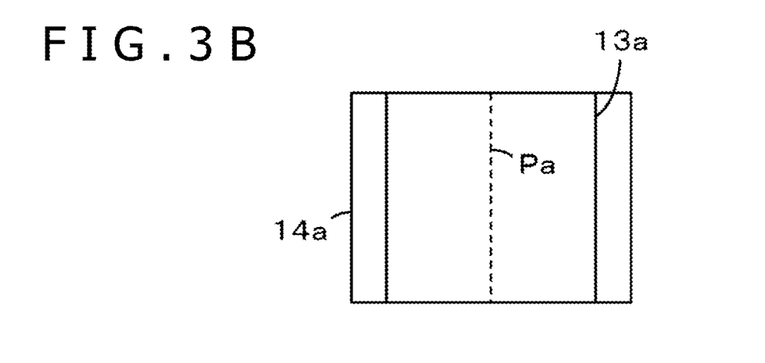

FIGS. 3A and 3B are views for describing the state in which the front-side portion 14F of the pressure member 14 fits into the front-side fitting portion 13F of the holding member 13. Specifically, FIG. 3A is a cross-sectional view of the front-side fitting portion 13F seen from the pen tip side when the front-side fitting portion 13F is cut in the direction intersecting the axis, with the pressure member 14 attached to and held in the holding member 13. FIG. 3B is a view seen from the direction indicated by an arrow of FIG. 3A. In FIG. 3B, the front-side fitting portion 13F of the holding member 13 is assumed to be transparent.

The inner space of the front-side fitting portion 13F of the holding member 13 (the space into which the front-side portion 14F of the pressure member 14 fits) is a space in which the mountain-shaped surface portions 13a and 13b face each other and arc-shaped inner wall surfaces 13c and 13d face each other, as illustrated in FIG. 3A. Assume that the front-side portion 14F of the pressure member 14 fits into the inner space of the front-side fitting portion 13F of the holding member 13. In this case, as illustrated in FIG. 3A, the mountain-shaped surface portion 13a of the holding member 13 faces the flat surface portion 14a of the pressure member 14, and the mountain-shaped surface portion 13b of the holding member 13 faces the flat surface portion 14b of the pressure member 14. Further, the arc-shaped inner wall surface 13c of the holding member 13 faces an arc-shaped side surface 14c of the pressure member 14, and the arc-shaped inner wall surface 13d of the holding member 13 faces an arc-shaped side surface 14d of the pressure member 14.

As can be seen from FIG. 3A, the opening shape of the inner space of the front-side fitting portion 13F of the holding member 13 in the direction intersecting the axis is not circular, and the cross-sectional shape of the front-side portion 14F of the pressure member 14 when cut in the direction intersecting the axis is not circular, either. The diameters of the arc-shaped inner wall surfaces of the holding member 13 and the diameters of the arc-shaped side surfaces of the pressure member 14 are similar to each other, although the diameters of the arc-shaped side surfaces of the pressure member 14 are smaller than the diameters of the arc-shaped inner wall surfaces of the holding member 13. Therefore, the pressure member 14 can move (slide) in the axial direction in the holding member 13, but the front-side portion 14F of the pressure member 14 does not rotate in the inner space of the front-side fitting portion 13F of the holding member 13.

Assume that, as illustrated in FIG. 3A, in the state in which the pressure member 14 holds the rear end of the core body 24, a force is applied to the core body 24 such that the core body 24 rotates about the axis. In this case, since the flat surface portions 14a and 14b of the front-side portion of the pressure member 14 respectively contact the mountain-shaped surface portions 13a and 13b of the front-side fitting portion 13F of the holding member 13, the pressure member 14 cannot rotate in the holding member 13. Therefore, the core body 24 held by the pressure member 14 does not rotate about the axis, either. This prevents the core body 24 from rotating about the axis.

Moreover, in the portion in which the mountain-shaped surface portion 13a of the holding member 13 and the flat surface portion 14a of the pressure member 14 face each other, the surfaces (an inclined surface and a flat surface) facing each other largely contact with each other. Accordingly, even if the pressure member 14 slightly rotates, the surface of the flat surface portion and the surface of the mountain-shaped surface portion are in contact with each other. This prevents the pressure member 14 from being caught on and fixed in the holding member 13. As illustrated in FIG. 3B, a vertex Pa of the mountain-shaped surface portion 13a mainly contacts the flat surface portion 14a of the pressure member 14 as indicated by a dotted line, but does not catch and fix the flat surface portion 14a. Similarly, in the portion in which the mountain-shaped surface portion 13b of the holding member 13 and the flat surface portion 14b of the pressure member 14 face each other, the area where the surfaces facing each other is large.

In this case, as with FIG. 3B, a vertex Pb of the mountain-shaped surface portion 13b mainly contacts the flat surface portion 14b of the pressure member 14 but does not catch and fix the flat surface portion 14b. In other words, even if a force is applied to the core body 24 and the pressure member 14 such that they rotate about the axis, this structure prevents the inner wall surfaces of the holding member 13 and the side surfaces of the pressure member 14 from being firmly engaged with each other and keeps them in soft surface-to-surface contact (engagement).

With this structure, the area of contact between the side surfaces of the front-side portion 14F of the pressure member 14 and the inner wall surfaces of the front-side fitting portion 13F of the holding member 13 is large. This structure prevents the inner wall surfaces of the front-side fitting portion 13F of the holding member 13 and the side surfaces of the front-side portion 14F of the pressure member 14 from being caught on each other and does not inhibit the movement of the core body 24 and the pressure member 14 in the axial direction. In other words, the writing pressure applied to the core body 24 can be properly transmitted to the writing pressure detector 25X.

Advantageous Effects of Embodiment

As described above, in the electronic pen 1 according to the present embodiment, the front-side portion 14F of the pressure member 14 can be prevented from rotating about the axis in the front-side fitting portion 13F of the holding member 13. This structure can also prevent the core body 24, whose rear end is held by the pressure member 14, from rotating about the axis. In this case, the inner edge shape of the front-side fitting portion 13F of the holding member 13 and the outer edge shape of the front-side portion 14F of the pressure member 14 are not similar circles. In other words, the size of the inner edge of the front-side fitting portion 13F of the holding member 13 is not large enough to allow the front-side portion 14F of the pressure member 14 to rotate. That is, the shape and size of the inner edge of the front-side fitting portion 13F of the holding member 13 and the shape and size of the outer edge of the front-side portion 14F of the pressure member 14 are similar to each other. Therefore, the front-side portion 14F of the pressure member 14 cannot rotate about the axis in the inner space of the front-side fitting portion 13F of the holding member 13, although the front-side portion 14F of the pressure member 14 and the front-side fitting portion 13F of the holding member 13 can be fitted together.

As described with reference to FIG. 3A, the inner wall surfaces of the front-side fitting portion 13F of the holding member 13 include the mountain-shaped surface portions 13*a* and 13*b* facing each other, and the side surfaces of the front-side portion 14F of the pressure member 14 facing these mountain-shaped surface portions 13*a* and 13*b* are the flat surface portions 14*a* and 14*b*. This structure slightly reduces the portion where the inner wall surfaces of the front-side fitting portion 13F of the holding member 13 and the side surfaces of the front-side portion 14F of the pressure member 14 are in contact with each other. However, such surface-to-surface contact enables the core body 24 and the pressure member 14 to smoothly move without being caught when the core body 24 and the pressure member 14 move in the axial direction. This structure can realize a mechanism for preventing the rotation of the core body 24 and the pressure member 14 about the axis without interfering with the writing pressure detection.

Therefore, in the electronic pen 1 described above, mutually fitting recessed and protruding portions to prevent the rotation of the core body 24 and the pressure member 14 do not need to be provided on the inner wall surfaces (inner side surfaces) of the front-side fitting portion 13F of the holding member 13 and the side surfaces (outer side surfaces) of the front-side portion 14F of the pressure member 14. This eliminates the difficulty of loading the pressure member 14 into the holding member 13 in the process of loading the pressure member 14 thereto. Accordingly, the pressure member 14 can be loaded using an automatic assembly machine. In other words, with the presence of the mechanism for preventing the rotation of the core body 24, the electronic pen can be assembled without difficulty and can be even assembled by an automatic assembly machine.

Modifications

In the embodiment described above, the mountain-shaped surface portions 13*a* and 13*b* are provided on the inner wall surfaces of the holding member 13, and the surfaces of the pressure member 14 facing the mountain-shaped surface portions 13*a* and 13*b* are the flat surface portions 14*a* and 14*b*. However, the present disclosure is not limited thereto. Various modifications can be made to the mountain-shaped surface portions 13*a* and 13*b* and the flat surface portions 14*a* and 14*b*. Hereinafter, modifications of the mountain-shaped surface portions 13*a* and 13*b* of the holding member 13, modifications of the flat surface portions 14*a* and 14*b* of the pressure member 14, and modifications of the appearance of the pressure member 14 are described. In the modifications described below, the configurations other than the portions described as the modifications are similar to those of the electronic pen 1 described with reference to FIGS. 1 to 3B. Therefore, in the modifications described below, the description of the portions configured similarly to the electronic pen 1 described with reference to FIGS. 1 to 3B is omitted to avoid redundant description.

Figure 4A:
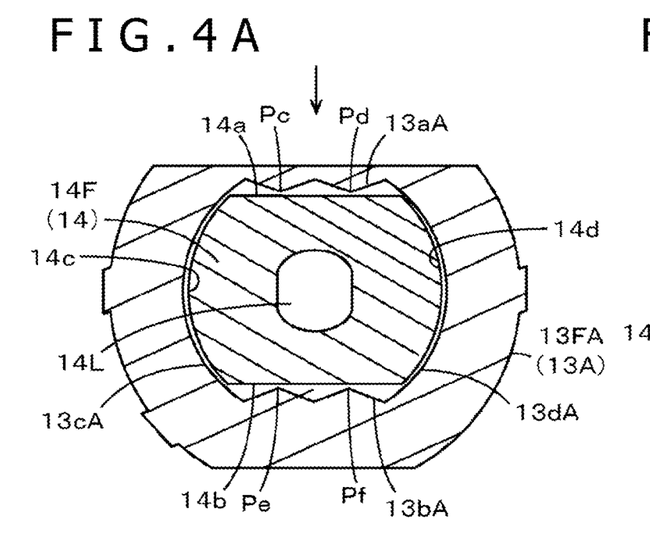
FIGS. 4A and 4B are views for describing another example of the holding member.
Figure 4B:
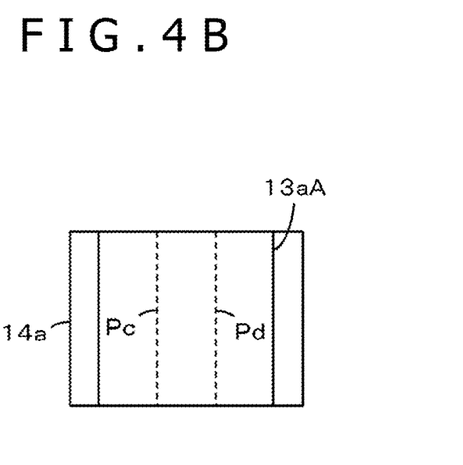

First Modification: Mountain-Shaped Surface Portions of Holding Member Have Two Vertices FIGS. 4A and 4B are views for describing another example (first modification) of the holding member 13 to describe the state in which the front-side portion 14F of the pressure member 14 is fitted into a front-side fitting portion 13FA of a holding member 13A. Specifically, FIG. 4A is a cross-sectional view of the front-side fitting portion 13FA seen from the pen tip side when the front-side fitting portion 13FA is cut in the direction intersecting the axis, with the pressure member 14 attached and held in the holding member 13A. FIG. 4B is a view seen from the direction indicated by an arrow of FIG. 4A. In FIG. 4B, the front-side fitting portion 13FA of the holding member 13A is assumed to be transparent.

The configuration of inner wall surfaces of the front-side fitting portion 13FA of the holding member 13A according to this example is different from that of the holding member 13 according to the embodiment described above, but the other portions are configured similarly to the holding member 13 according to the embodiment described above. In the inner space of the front-side fitting portion 13FA of the holding member 13A according to this example (the space into which the front-side portion 14F of the pressure member 14 fits), a mountain-shaped surface portion 13*a*A with two vertices Pc and Pd and a mountain-shaped surface portion 13*b*A with two vertices Pe and Pf face each other, as illustrated in FIG. 4A. Further, an outwardly bulging arc-shaped inner wall surface 13*c*A and an outwardly bulging arc-shaped inner wall surface 13*d*A face each other.

Assume that the front-side portion 14F of the pressure member 14 fits into the inner space of the front-side fitting portion 13FA of the holding member 13A. In this case, as illustrated in FIG. 4A, the mountain-shaped surface portion 13*a*A of the holding member 13A and the flat surface portion 14*a* of the pressure member 14 face each other, and the mountain-shaped surface portion 13*b*A of the holding member 13A and the flat surface portion 14*b* of the pressure member 14 face each other. Further, the arc-shaped inner wall surface 13*c*A of the holding member 13A and the arc-shaped side surface 14*c* of the pressure member 14 face each other, and the arc-shaped inner wall surface 13*d*A of the holding member 13A and the arc-shaped side surface 14*d* of the pressure member 14 face each other.

As can be seen from FIG. 4A, the outer edge shape of the front-side portion 14F of the pressure member 14 is not circular, and the inner edge shape of the front-side fitting portion 13FA of the holding member 13A is not circular, either. Further, the space between the two members is small. Therefore, the front-side portion 14F of the pressure member 14 cannot rotate about the axis in the inner space of the front-side fitting portion 13FA of the holding member 13A.

As illustrated in FIG. 4B, since the two vertices Pc and Pd of the mountain-shaped surface portion 13*a*A mainly contact the flat surface portion 14*a* of the pressure member 14, as indicated by dotted lines, the surfaces facing each other do not largely contact with each other. Similarly, since the two vertices Pe and Pf of the mountain-shaped surface portion 13*b*A contact the flat surface portion 14*b* of the pressure member 14, the surfaces facing each other do not largely contact with each other. However, this can be considered as a surface-to-surface contact.

This structure slightly reduces the area of contact between the side surfaces of the front-side portion 14F of the pressure member 14 and the inner wall surfaces of the front-side fitting portion 13FA of the holding member 13A but ensures a surface-to-surface contact. This structure prevents the inner wall surfaces of the front-side fitting portion 13FA of the holding member 13A and the side surfaces of the front-side portion 14F of the pressure member 14 from being caught on each other and does not inhibit the movement of the core body 24 and the pressure member 14 in the axial direction. In other words, the writing pressure applied to the core body 24 can be properly transmitted to the writing pressure detector 25X.

With the modification illustrated in FIGS. 4A and 4B, the rotation of the pressure member 14 about the axis in the front-side fitting portion 13FA of the holding member 13A can be inhibited compared to the case of the electronic pen 1 illustrated in FIGS. 3A and 3B. Further, the number of vertices of each mountain-shaped surface portion is not limited to one (FIGS. 3A and 3B) or two (FIGS. 4A and 4B). The number of vertices of each mountain-shaped surface portion may be three or more. However, as the number of vertices increases, it is more likely that the inner wall surfaces of the front-side fitting portion of the holding member and the side surfaces of the front-side portion of the pressure member are caught on each other. Therefore, the number of vertices of each mountain-shaped surface portion needs to be determined to the extent that they are not caught on each other.

Figure 5A:
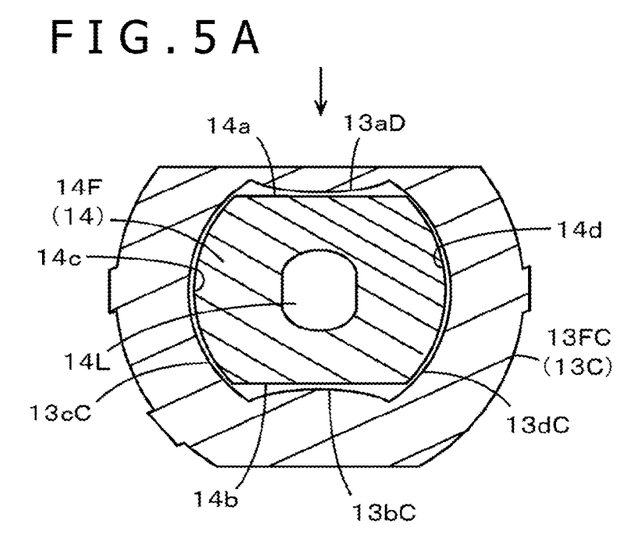
FIGS. 5A and 5B are views for describing still another example of the holding member.
Figure 5B:
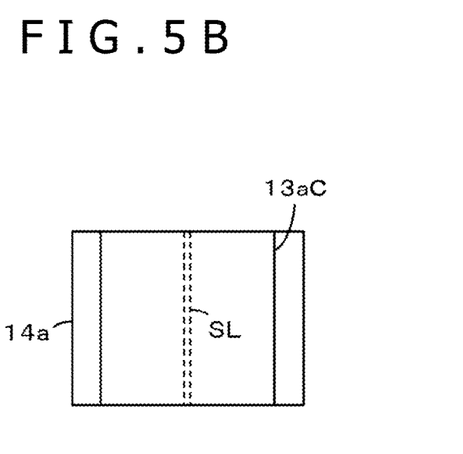

Second Modification: Arc-Shaped Surface Portions Bulging Inward in Arc Shape Instead of Mountain-Shaped Surface Portions FIGS. 5A and 5B are views for describing still another example (second modification) of the holding member 13 to describe the state in which the front-side portion 14F of the pressure member 14 is fitted into a front-side fitting portion 13FC of a holding member 13C. Specifically, FIG. 5A is a cross-sectional view of the front-side fitting portion 13FC seen from the pen tip side when the front-side fitting portion 13FC is cut in the direction intersecting the axis, with the pressure member 14 attached and held in the holding member 13C. FIG. 5B is a view seen from the direction indicated by an arrow of FIG. 5A. In FIG. 5B, the front-side fitting portion 13FC of the holding member 13C is assumed to be transparent.

The configuration of inner wall surfaces of the front-side fitting portion 13FC of the holding member 13C according to this example is different from that of the holding member 13 according to the embodiment described above, but the other portions are configured similarly to the holding member 13 according to the embodiment described above. In the inner space of the front-side fitting portion 13FC of the holding member 13C according to this example (the space into which the front-side portion 14F of the pressure member 14 fits), an arc-shaped surface portion 13aC and a similar arc-shaped surface portion 13bC face each other, as illustrated in FIG. 5A. The arc-shaped surface portions 13aC and 13bC are surface portions that bulge inward in an arc shape, resembling a top portion of a rolled cake. Further, an outwardly bulging arc-shaped inner wall surface 13cC and an outwardly bulging arc-shaped inner wall surface 13dC face each other.

Assume that the front-side portion 14F of the pressure member 14 fits into the inner space of the front-side fitting portion 13FC of the holding member 13C. In this case, as illustrated in FIG. 5A, the arc-shaped surface portion 13aC of the holding member 13C and the flat surface portion 14a of the pressure member 14 face each other, and the arc-shaped surface portion 13bC of the holding member 13C and the flat surface portion 14b of the pressure member 14 face each other. Further, the arc-shaped inner wall surface 13cC of the holding member 13C and the arc-shaped side surface 14c of the pressure member 14 face each other, and the arc-shaped inner wall surface 13dC of the holding member 13C and the arc-shaped side surface 14d of the pressure member 14 face each other.

As can be seen from FIG. 5A, the outer edge shape of the front-side portion 14F of the pressure member 14 is not circular, and the inner edge shape of the front-side fitting portion 13FC of the holding member 13C is not circular, either. Further, the space between the two members is small. Therefore, the front-side portion 14F of the pressure member 14 cannot rotate about the axis in the inner space of the front-side fitting portion 13FC of the holding member 13C.

As illustrated in FIG. 5B, since a vertex portion SL of the arc-shaped surface portion 13aC mainly contacts the flat surface portion 14a of the pressure member 14, as indicated by dotted lines, the surfaces facing each other do not largely contact with each other. Similarly, since a vertex portion of the arc-shaped surface portion 13bC contacts the flat surface portion 14b of the pressure member 14, the surfaces facing each other do not largely contact with each other. However, this can be also considered as a surface-to-surface contact.

This structure slightly reduces the area of contact between the side surfaces of the front-side portion 14F of the pressure member 14 and the inner wall surfaces of the front-side fitting portion 13FC of the holding member 13C but ensures a surface-to-surface contact. This structure prevents the inner wall surfaces of the front-side fitting portion 13FC of the holding member 13C and the side surfaces of the front-side portion 14F of the pressure member 14 from being caught on each other and does not inhibit the movement of the core body 24 and the pressure member 14 in the axial direction. In other words, the writing pressure applied to the core body 24 can be properly transmitted to the writing pressure detector 25X.

With the modification illustrated in FIGS. 5A and 5B, increasing the radiuses of the arc-shaped portions of the arc-shaped surface portions 13aC and 13bC too much makes the inward bulges gradual and increases the width of contact with the flat surface portions 14a and 14b of the pressure member 14 that face the arc-shaped surface portions 13aC and 13bC, respectively. This increases the possibility that the inner wall surfaces of the front-side fitting portion of the holding member and the side surfaces of the front-side portion of the pressure member are caught on each other. Therefore, the radiuses of the arc-shaped portions of the arc-shaped surface portions 13aC and 13bC, that is, the degree of inward bulges, needs to be determined so as not to cause the inner wall surfaces of the front-side fitting portion of the holding member and the side surfaces of the front-side portion of the pressure member to be caught on each other.

Figure 6A:
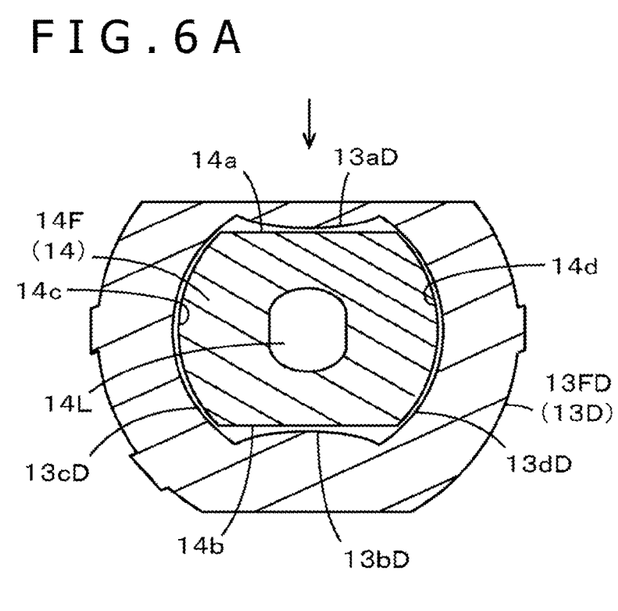
FIGS. 6A and 6B are views for describing yet another example of the holding member.
Figure 6B:
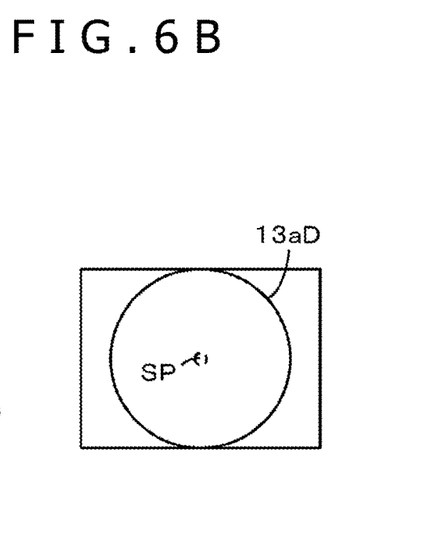

Third Modification: Spherical Surface Portions Bulging Inward in Spherical Shape (Dome Shape) Instead of Mountain-Shaped Surface Portions FIGS. 6A and 6B are views for describing yet another example (third modification) of the holding member 13 to describe the state in which the front-side portion 14F of the pressure member 14 is fitted into a front-side fitting portion 13FD of a holding member 13D. Specifically, FIG. 6A is a cross-sectional view of the front-side fitting portion 13FD seen from the pen tip side when the front-side fitting portion 13FD is cut in the direction intersecting the axis, with the pressure member 14 attached and held in the holding member 13D. FIG. 6B is a view seen from the direction indicated by an arrow of FIG. 6A. In FIG. 6B, the front-side fitting portion 13FD of the holding member 13D is assumed to be transparent.

The configuration of inner wall surfaces of the front-side fitting portion 13FD of the holding member 13D according to this example is different from that of the holding member 13 according to the embodiment described above, but the other portions are configured similarly to the holding member 13 according to the embodiment described above. In the inner space of the front-side fitting portion 13FD of the holding member 13D according to this example (the space into which the front-side portion 14F of the pressure member 14 fits), a spherical surface portion 13aD, which bulges inward in a dome shape and thus resembles part of a ball, and a similar spherical surface portion 13bD face each other, as illustrated in FIG. 6A. Further, an outwardly bulging arc-shaped inner wall surface 13cD and an outwardly bulging arc-shaped inner wall surface 13dD face each other.

Assume that the front-side portion 14F of the pressure member 14 fits into the inner space of the front-side fitting portion 13FD of the holding member 13D. In this case, as illustrated in FIG. 6A, the spherical surface portion 13aD of the holding member 13D and the flat surface portion 14a of the pressure member 14 face each other, and the spherical surface portion 13bD of the holding member 13D and the flat surface portion 14b of the pressure member 14 face each other. Further, the arc-shaped inner wall surface 13cD of the holding member 13D and the arc-shaped side surface 14c of the pressure member 14 face each other, and the arc-shaped inner wall surface 13dD of the holding member 13D and the arc-shaped side surface 14d of the pressure member 14 face each other.

As can be seen from FIG. 6A, the outer edge shape of the front-side portion 14F of the pressure member 14 is not circular, and the inner edge shape of the front-side fitting portion 13FD of the holding member 13D is not circular, either. Further, the space between the two members is small. Therefore, the front-side portion 14F of the pressure member 14 cannot rotate about the axis in the inner space of the front-side fitting portion 13FD of the holding member 13D.

As illustrated in FIG. 6B, since a vertex portion SP of the spherical surface portion 13aD mainly contacts the flat surface portion 14a of the pressure member 14, as indicated by a dotted small circle, the surfaces facing each other do not largely contact with each other. Similarly, since a vertex portion of the spherical surface portion 13bD contacts the flat surface portion 14b of the pressure member 14, the surfaces facing each other do not largely contact with each other.

This structure slightly reduces the area of contact between the side surfaces of the front-side portion 14F of the pressure member 14 and the inner wall surfaces of the front-side fitting portion 13FD of the holding member 13D but ensures a surface-to-surface contact. This structure prevents the inner wall surfaces of the front-side fitting portion 13FD of the holding member 13D and the side surfaces of the front-side portion 14F of the pressure member 14 from being firmly engaged with each other and prevents the inner wall surfaces of the front-side fitting portion 13FD of the holding member 13D and the side surfaces of the front-side portion 14F of the pressure member 14 from being "caught" on each other. Moreover, this structure does not inhibit the movement of the core body 24 and the pressure member 14 in the axial direction. In other words, the writing pressure applied to the core body 24 can be properly transmitted to the writing pressure detector 25X.

With the modification illustrated in FIGS. 6A and 6B, increasing the bulges of the spherical surface portions 13aD and 13bD too much increases the area of contact with the flat surface portions 14a and 14b of the pressure member 14 that face the spherical surface portions 13aD and 13bD, respectively. This increases the possibility that the inner wall surfaces of the front-side fitting portion of the holding member and the side surfaces of the front-side portion of the pressure member are caught on each other. Therefore, the degree of the bulges of the spherical surface portions 13aD and 13bD needs to be determined so as not to cause the inner wall surfaces of the front-side fitting portion of the holding member and the side surfaces of the front-side portion of the pressure member to be caught on each other.

Fourth Modification: Changing Shape of Side Surfaces of Pressure Member

Figure 7:
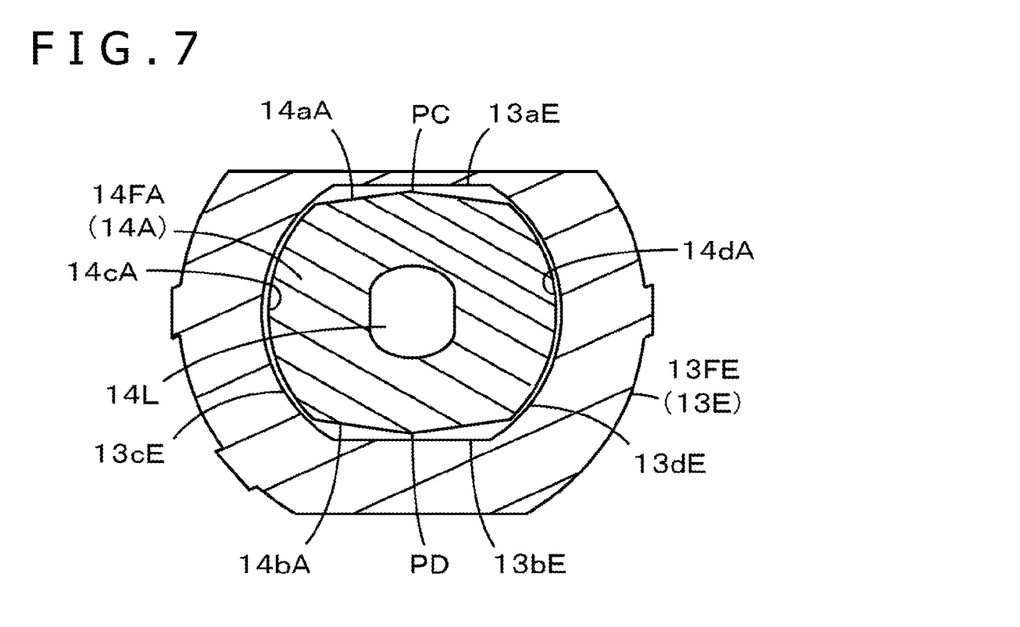
FIG. 7 is a view for describing a further example of the holding member.

FIG. 7 is a view for describing a further example (fourth modification) of the holding member 13 and the pressure member 14 to describe the state in which a front-side portion 14FA of a pressure member 14A is fitted into a front-side fitting portion 13FE of a holding member 13E. Specifically, FIG. 7 is a cross-sectional view of the front-side fitting portion 13FE seen from the pen tip side when the front-side fitting portion 13FE is cut in the direction intersecting the axis, with the pressure member 14A attached and held in the holding member 13E.

The configuration of inner wall surfaces of the front-side fitting portion 13FE of the holding member 13E according to this example is different from that of the holding member 13 according to the embodiment described above, but the other portions are configured similarly to the holding member 13 according to the embodiment described above. Similarly, in the pressure member 14A according to this example, the configuration of side surfaces of the front-side portion 14FA of the pressure member 14A according to this example is different from that of the pressure member 14 according to the embodiment described above, but the other portions are configured similarly to the pressure member 14 according to the embodiment described above.

In the inner space of the front-side fitting portion 13FE of the holding member 13E according to this example (the space into which the front-side portion 14FA of the pressure member 14A fits), a smoothed flat surface portion (holding-member flat surface portion) 13aE and a smoothed flat surface portion (holding-member flat surface portion) 13bE face each other, as illustrated in FIG. 7. Further, an arc-shaped inner wall surface 13cE and an arc-shaped inner wall surface 13dE face each other. By contrast, the side surfaces of the pressure member 14A that face each other across the core-body holding hole 14L are a mountain-shaped surface portion 14aA and a mountain-shaped surface portion 14bA.

In other words, each of the mountain-shaped surface portions 14aA and 14bA of the front-side portion 14FA of the pressure member 14A has one linear portion extending along the axial direction and protruding outward (protruding toward the inner wall surface of the holding member 13E). With this structure, as illustrated in FIG. 7, the mountain-shaped surface portions 14aA and 14bA are formed in a mountain shape (V-shape) with linear portions PC and PD serving as respective vertices and each having surfaces inclined to the left and right. The portions of the front-side portion 14FA of the pressure member 14A other than the mountain-shaped surface portions 14aA and 14bA are arc-shaped side surfaces.

This creates the state in which the relation between the flat surface portions of the front-side portion 14F of the pressure member 14 and the mountain-shaped surface portions of the front-side fitting portion 13F of the holding member 13 illustrated in FIG. 3A is opposite in FIG. 7. The structure in FIG. 3A prevents the front-side portion 14F of the pressure member 14 from rotating about the axis in the front-side fitting portion 13F of the holding member 13. In other words, the state illustrated in FIG. 7 is the same as the state illustrated in FIG. 3B. The vertex PC of the mountain-shaped surface portion 14aA of the front-side portion 14FA of the pressure member 14A mainly contacts the flat surface portion 13aE of the front-side fitting portion 13FE of the holding member 13E. Similarly, the vertex PD of the mountain-shaped surface portion 14bA of the front-side portion 14FA of the pressure member 14A mainly contacts the flat surface portion 13bE of the front-side fitting portion 13FE of the holding member 13E.

However, when a force is applied to the core body 24 and the pressure member 14A to rotate them about the axis, a surface-to-surface contact is made in the portion in which the flat surface portion 13aE of the holding member 13E and the mountain-shaped surface portion 14aA of the pressure member 14A face each other. Similarly, a surface-to-surface contact is made in the portion in which the flat surface portion 13bE of the holding member 13E and the mountain-shaped surface portion 14bA of the pressure member 14A face each other. With this structure, the inner wall surfaces of the holding member 13E and the side surfaces of the pressure member 14A are loosely engaged with each other. Accordingly, since what is generally called catching that would otherwise be caused by strong engagement between the inner wall surfaces of the holding member 13E and the side surfaces of the pressure member 14A does not occur, a writing pressure can be detected properly.

Therefore, as with the holding member 13E illustrated in FIG. 7, in the inner space of the front-side fitting portion 13FE, the smoothed flat surface portions 13aE and 13bE face each other. By contrast, the front-side portion of the pressure member can employ various patterns. For example, in the front-side portion of the pressure member, the side surfaces facing the flat surface portions 13aE and 13bE of the front-side fitting portion 13FE may be each formed into a mountain-shaped surface portion with two vertices as with the mode illustrated in FIG. 4A. Needless to say, the number of vertices can be increased to an appropriate number.

Alternatively, in the front-side portion of the pressure member, the side surfaces facing the flat surface portions 13aE and 13bE of the front-side fitting portion 13FE can be each formed into an arc-shaped surface portion as with the mode illustrated in FIG. 5A. Alternatively, in the front-side portion of the pressure member, the side surfaces facing the flat surface portions 13aE and 13bE of the front-side fitting portion 13FE can be each formed into a spherical surface portion that bulges in a dome shape as with the mode illustrated in FIG. 6A.

Further, in the above-described embodiment and the modifications illustrated in FIGS. 4A to 7, the flat surface portion and the mountain-shaped surface portion, the flat surface portion and the arc-shaped surface portion, and the flat surface portion and the spherical surface portion face each other to configure the surfaces facing each other in the upper and lower portions of FIGS. 4A to 7. However, the present disclosure is not limited thereto, and the surfaces facing each other in the left and right portions of FIGS. 4A to 7 may be the flat surface portion and the mountain-shaped surface portion, the flat surface portion and the arc-shaped surface portion, or the flat surface portion and the spherical surface portion. Needless to say, the surfaces facing each other in the upper and lower portions of FIGS. 4A to 7 and the surfaces facing each other in the left and right portions of FIGS. 4A to 7 may be formed in the mode described above. In short, it suffices that the inner wall surfaces of the holding member and the side surfaces of the pressure member are not strongly engaged with each other and the surfaces are softly engaged with each other when a force is applied to the core body and the pressure member as to rotate about the axis. This prevents the core body and the pressure member from rotating about the axis and does not inhibit the movement of the core body and the pressure member in the axial direction.

Fifth Modification: Modification of Rear-Side Portion of Pressure Member

Figure 8:
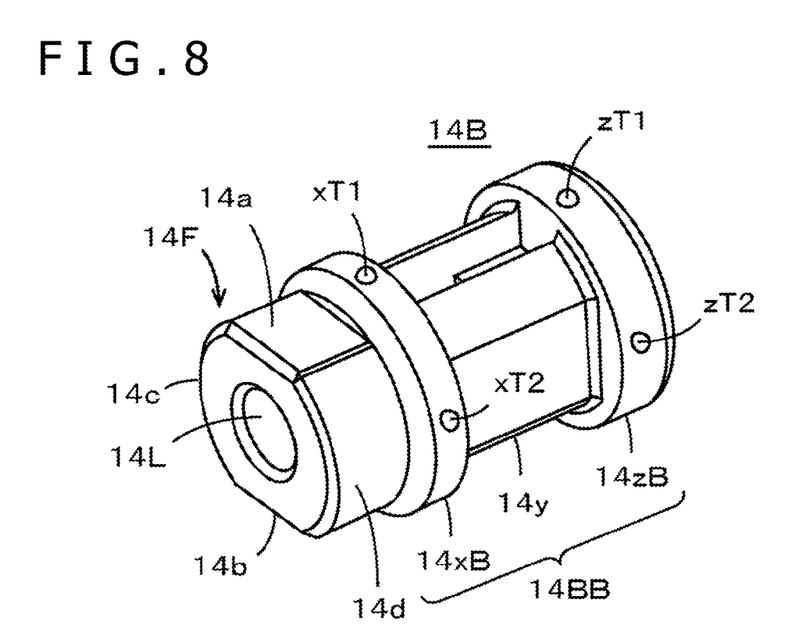
FIG. 8 is a view for describing another example of the pressure member.

FIG. 8 is a view for describing another example of the pressure member. As can be seen from comparison between FIG. 8 and FIG. 2B, a pressure member 14B according to this example is characterized by a front-side protruding portion 14xB and a rear-side protruding portion 14zB of a rear-side portion 14BB. The other portions are configured similarly to the pressure member 14 illustrated in FIG. 2B. Thus, in FIG. 8, the portions configured similarly to the pressure member 14 illustrated in FIG. 2B are given the same reference signs as those of the pressure member 14 of FIG. 2B.

In the case of the pressure member 14B illustrated in FIG. 8, protrusions are provided on a side surface of the front-side protruding portion 14xB, including protrusions xT1 and xT2. Although not visible in FIG. 8, one of the protrusions is provided at the position opposite the protrusion xT1 across the core-body holding hole 14L, and one of the protrusions is provided at the position opposite the protrusion xT2 across the core-body holding hole 14L. In other words, one protrusion is provided on each of the top, bottom, left, and right portions of the side surface of the front-side protruding portion 14xB.

Similarly, in the case of the pressure member 14B illustrated in FIG. 8, protrusions are provided on a side surface of the rear-side protruding portion 14zB, including zT1 and zT2. Although not visible in FIG. 8, one of the protrusions is provided at the position opposite the protrusion zT1 across the core-body holding hole 14L, and one of the protrusions is provided at the position opposite the protrusion zT2 across the core-body holding hole 14L. In other words, one protrusion is provided on each of the top, bottom, left, and right portions of the side surface of the front-side protruding portion 14xB.

This structure reduces the portion in which the side surface of the front-side protruding portion 14xB of the rear-side portion 14BB and the side surface of the rear-side protruding portion 14zB of the rear-side portion 14BB contact the inner wall surfaces of the rear-side fitting portion 13Bk of the holding member 13. In other words, this structure reliably prevents the state in which the side surface of the front-side protruding portion 14xB of the rear-side portion 14BB and the side surface of the rear-side protruding portion 14zB of the rear-side portion 14BB are strongly engaged with the inner wall surfaces of the rear-side fitting portion 13Bk of the holding member 13. Accordingly, the core body 24 and the pressure member 14B can move more smoothly according to the writing pressure in the axial direction.

The number, size, and positions of the protrusions provided on the side surface of the front-side protruding portion 14xB and the side surface of the rear-side protruding portion 14zB can vary. In the case of the pressure member 14B illustrated in FIG. 8, the protrusions may be provided on the arc-shaped side surfaces of the front-side portion 14F.

Other Examples of Shapes of Holding Member and Pressure Member

Although the writing pressure detector 25X is provided on the rear end side of the holding member 13 in the embodiment described above, the present disclosure is not limited thereto. The holding member 13 may hold the pressure member 14 and the writing pressure detector 25X.

Although the core body 24 and the pressure member 14 are configured as separate members in the embodiment described above, a core body portion integrally including the core body 24 and the pressure member 14 may be formed.

Further, in the embodiment described above, the holding member 13 is described as having a tubular shape and including the front-side fitting portion 13F and the rear-side fitting portion 13Bk having an inner diameter larger than that of the front-side fitting portion 13F. Correspondingly, the pressure member 14 is described as having a cylindrical shape and including the front-side portion 14F and the rear-side portion 14Bk having an outer diameter larger than that of the front-side portion 14F. The present disclosure is, however, not limited thereto.

For example, the holding member may be a tubular body with a uniform inner diameter. Accordingly, the corresponding core body portion can also have a cylindrical shape with a uniform outer diameter in a portion held by the holding member. In this case, at least a flat surface portion parallel to the axial direction is provided on at least part of side surfaces of the core body portion. Meanwhile, a protruding portion is provided on part of the inner wall surfaces of the holding member. With the core body portion attached to the housing, the flat surface portion of the core body portion and the protruding portion of the holding member face each other. In this case, the flat surface portion provided on the core body portion may be a portion of the core body portion that is accommodated in the holding member and constitutes the core body or may be a portion of the core body portion that is accommodated in the holding member and corresponds to a portion of the pressure member.

Conversely, a protruding portion is provided on at least part of the side surface of the core body portion. Meanwhile, a flat surface portion parallel to the axial direction is provided on part of the inner wall surfaces of the holding member. With the core body portion attached to the housing, the protruding portion of the core body portion and the flat surface portion of the holding member face each other. In this case, the protruding portion provided on the core body portion may be a portion of the core body portion that is accommodated in the holding member and constitutes the core body or may be a portion of the core body portion that is accommodated in the holding member and corresponds to a portion of the pressure member.

Other Modifications

In the examples described with reference to FIGS. 3A to 4B, each of the linear vertices Pa, Pb, Pc, Pd, Pe, and Pf, which extend in the axial direction, does not need to be provided as a continuous linear vertex. Each vertex may be formed discretely in the axial direction.

Further, as described above, the present disclosure is applicable to an electromagnetic induction electronic pen including a resonance circuit including a coil and a capacitor connected to the coil. In addition, the present disclosure is also applicable to an active capacitive electronic pen including a core body having power transmission properties and a transmission circuit that generates a position indication signal to be transmitted from the core body.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen, comprising:
   a tubular housing having an opening at one end;
   a core body portion including:
      a rod-shaped core body protruding from the opening of the housing with one end serving as a pen tip, and
      a pressure member that holds a rear end of the core body and transmits a force applied to the core body;
   a writing pressure detector that is fixed inside the housing, wherein the writing pressure detector, in operation, detects a writing pressure applied to the core body; and
   a tubular holding member that is fixed inside the housing and accommodates and holds the core body portion,
   wherein the pressure member includes a front-side portion having a front-end surface with a core-body holding hole formed in the front-end surface,
   wherein the rear end of the core body is inserted into the pressure member from the front-end surface of the front-side portion of the pressure member,
   wherein at least part of a side surface of the core body portion includes a flat surface portion parallel to an axial direction of the electronic pen,
   wherein an inner edge of the holding member has a cylindrical shape and at least part of the inner edge includes a protruding portion, and
   wherein, with the core body portion mounted in the housing, the flat surface portion of the core body portion and the protruding portion of the holding member face each other.

2. The electronic pen according to claim 1, wherein the flat surface portion of the core body portion is provided on the core body.

3. The electronic pen according to claim 1, wherein the flat surface portion of the core body portion is provided on the pressure member.

4. The electronic pen according to claim 1, wherein the holding member holds the pressure member of the core body portion and the writing pressure detector.

5. An electronic pen, comprising:
   a tubular housing having an opening at one end;
   a core body portion including:
      a rod-shaped core body protruding from the opening of the housing with one end serving as a pen tip, and
      a pressure member that holds a rear end of the core body and transmits a force applied to the core body;
   a writing pressure detector that is fixed inside the housing, wherein the writing pressure detector, in operation, detects a writing pressure applied to the core body; and
   a tubular holding member that is fixed inside the housing and accommodates and holds the core body portion,
   wherein the pressure member includes a front-side portion having a front-end surface with a core-body holding hole formed in the front-end surface,
   wherein the rear end of the core body is inserted into the pressure member from the front-end surface of the front-side portion of the pressure member, wherein at least part of a side surface of the core body portion includes a protruding portion, wherein an inner edge of the holding member has a cylindrical shape and at least part of the inner edge includes a flat surface portion parallel to an axial direction of the electronic pen, and, wherein with the core body portion mounted in the housing, the protruding portion of the core body portion and the flat surface portion of the holding member face each other.

6. An electronic pen, comprising:

a tubular housing having an opening at one end;

a rod-shaped core body that is attached inside the housing and protrudes from the opening of the housing with one end serving as a pen tip;

a writing pressure detector that is fixed inside the housing, wherein the writing pressure detector, in operation, detects a writing pressure applied to the core body;

a pressure member that holds a rear end of the core body inserted from the opening of the housing and presses the writing pressure detector according to the writing pressure applied to the core body; and a tubular holding member that is fixed inside the housing and accommodates and holds the pressure member, wherein the pressure member has a substantially cylindrical shape, includes a front-side portion and a rear-side portion having a diameter larger than a diameter of the front-side portion, and has a core-body holding hole into which a rear end side of the core body is inserted from a front-end surface of the front-side portion, wherein the holding member includes a front-side fitting portion into which the front-side portion of the pressure member fits and a rear-side fitting portion into which the rear-side portion of the pressure member fits, wherein an end of the front-side fitting portion on a pen tip side has an insertion hole into which the core body is inserted, while an end of the rear-side fitting portion on the rear end side has a rear-end opening into which the pressure member is inserted, and wherein an inner edge of the front-side fitting portion of the holding member and an outer edge of the front-side portion of the pressure member are shaped to enable the front-side portion of the pressure member to fit into the front-side fitting portion of the holding member, inhibit the front-side portion of the pressure member from rotating about an axis in the front-side fitting portion of the holding member, and allow an inner wall surface of the front-side fitting portion of the holding member and a side surface of the front-side portion of the pressure member to partially contact with each other, while no mutually fitting recessed and protruding portions are provided on the inner wall surface of the front-side fitting portion of the holding member and the side surface of the front-side portion of the pressure member.

7. The electronic pen according to claim 6, wherein the front-side portion of the pressure member includes a pressure-member flat surface portion having flat side surfaces facing each other across the core-body holding hole, wherein an opposing surface of the front-side fitting portion of the holding member facing the pressure-member flat surface portion has a V-shaped surface portion formed by one or more linear portions extending in a direction along an axial direction of the electronic pen and protruding toward the pressure-member flat surface portion, and wherein the one or more linear portions contact the pressure-member flat surface portion.

8. The electronic pen according to claim 6, wherein the inner wall surface of the front-side fitting portion of the holding member includes a holding-member flat surface portion having flat surfaces facing each other across the front-side portion of the pressure member, wherein an opposing surface of the front-side portion of the pressure member facing the holding-member flat surface portion has a V-shaped surface portion formed by one or more linear portions extending in a direction along an axial direction of the electronic pen and protruding toward the holding-member flat surface portion, and wherein the one or more linear portions contact the holding-member flat surface portion.

9. The electronic pen according to claim 6, wherein the front-side portion of the pressure member includes a pressure-member flat surface portion having flat side surfaces facing each other across the core-body holding hole, wherein an opposing surface of the front-side fitting portion of the holding member facing the pressure-member flat surface portion has an arc shape, and wherein a vertex portion of the opposing surface having the arc shape contacts the pressure-member flat surface portion.

10. The electronic pen according to claim 6, wherein the inner wall surface of the front-side fitting portion of the holding member includes a holding-member flat surface portion having flat surfaces facing each other across the front-side portion of the pressure member, wherein an opposing surface of the front-side portion of the pressure member facing the holding-member flat surface portion has an arc shape, and wherein a vertex portion of the opposing surface having the arc shape contacts the holding-member flat surface portion.

11. The electronic pen according to claim 6, wherein the front-side portion of the pressure member includes a pressure-member flat surface portion having flat side surfaces facing each other across the core-body holding hole, wherein an opposing surface of the front-side fitting portion of the holding member facing the pressure-member flat surface portion has a spherical shape, and wherein a vertex portion of the opposing surface having the spherical shape contacts the pressure-member flat surface portion.

12. The electronic pen according to claim 6, wherein the inner wall surface of the front-side fitting portion of the holding member includes a holding-member flat surface portion having flat surfaces facing each other across the front-side portion of the pressure member, wherein an opposing surface of the front-side portion of the pressure member facing the holding-member flat surface portion has a spherical shape, and wherein a vertex portion of the opposing surface having the spherical shape contacts the holding-member flat surface portion.

13. The electronic pen according to claim 6, wherein the rear-side portion of the pressure member includes a front-side protruding portion, a middle portion, and a rear-side protruding portion, and wherein a diameter of the middle portion is smaller than a diameter of the front-side protruding portion and a diameter of the rear-side protruding portion.

14. The electronic pen according to claim 6, wherein the rear-side portion of the pressure member has a side surface on which protrusions that are in contact with an inner wall surface of the rear-side fitting portion of the holding member are formed.

15. The electronic pen according to claim 6, further comprising:
  a resonance circuit including a coil wound around a side surface of the core body and a capacitor connected to the coil.

16. The electronic pen according to claim 6,
  wherein the core body is electrically conductive, and
  wherein the electronic pen includes a transmission circuit that supplies, to the core body, a position indication signal to be transmitted from the core body.

* * * * *